United States Patent
Binder

(10) Patent No.: US 7,035,266 B2
(45) Date of Patent: Apr. 25, 2006

(54) NETWORK SWITCH DISCOVERY METHOD AND APPARATUS

(75) Inventor: Douglas B. Binder, Colorado Springs, CO (US)

(73) Assignee: Fluke Corporation, Everett, WA (US)

( * ) Notice: Subject to any disclaimer, the term of this patent is extended or adjusted under 35 U.S.C. 154(b) by 963 days.

(21) Appl. No.: 10/085,208

(22) Filed: Feb. 26, 2002

(65) Prior Publication Data

US 2003/0161274 A1    Aug. 28, 2003

(51) Int. Cl.
*H04L 12/56*    (2006.01)
(52) U.S. Cl. ................... 370/395.53; 370/254
(58) Field of Classification Search ........ 370/252–254, 370/351, 355, 357, 359, 360, 386, 395.53, 370/408, 422
See application file for complete search history.

(56) References Cited

U.S. PATENT DOCUMENTS

| | | | |
|---|---|---|---|
| 5,751,967 A | 5/1998 | Raab et al. | |
| 5,796,736 A | 8/1998 | Suzuki | |
| 5,821,760 A | 10/1998 | Koeman et al. | |
| 5,946,301 A | 8/1999 | Swanson et al. | |
| 5,951,649 A * | 9/1999 | Dobbins et al. | 709/238 |
| 6,085,238 A * | 7/2000 | Yuasa et al. | 709/223 |
| 6,909,708 B1 * | 6/2005 | Krishnaswamy et al. | 370/352 |
| 2003/0086515 A1 * | 5/2003 | Trans et al. | 375/346 |

OTHER PUBLICATIONS

S. Rigney, "An Administrative Gumshoe", PC MAGAZINE: Net Tools, Jun. 30, 1988, http://www.zdnet.com/pcmag/pclabls/nett (2 pages).
Fluke, "Network Maintenance & Troubleshooting Guide" http://www.fluke.com/products/home.asp?SID=10&AGID=8&PID=427 (2 pages).
Fluke, "PC Inspector™ Network Assistant", http://www.fluke.com/products/home.asp?SID=10&AGID=8&PID=218 (2 pages).
Fluke, "PC Inspector™ Network Assistant Features" http://www.fluke.com/products/features.asp?SID=10&AGID=8&PID=218 (4 pages).
Fluke, "Network Inspector™ Software Features", http://www.fluke.com/products/features.asp?SID=10&AGID=8&PID (3 pages).
Fluke, "Network Inspector™ Network management for the rest of us", www.fluke.com/nettools. (1 page).

* cited by examiner

*Primary Examiner*—Dang Ton
*Assistant Examiner*—Phuc Tran
(74) *Attorney, Agent, or Firm*—Dellett & Walters

(57) ABSTRACT

A system for determining whether a switch on a local area network is connected to a host device. The forwarding tables for switches on at least a subnet of the network are accessed, and for each switch that lists the host, a determination is made whether the switch listing the host is seen on the same port as the host by all other switches that see the host.

7 Claims, 3 Drawing Sheets

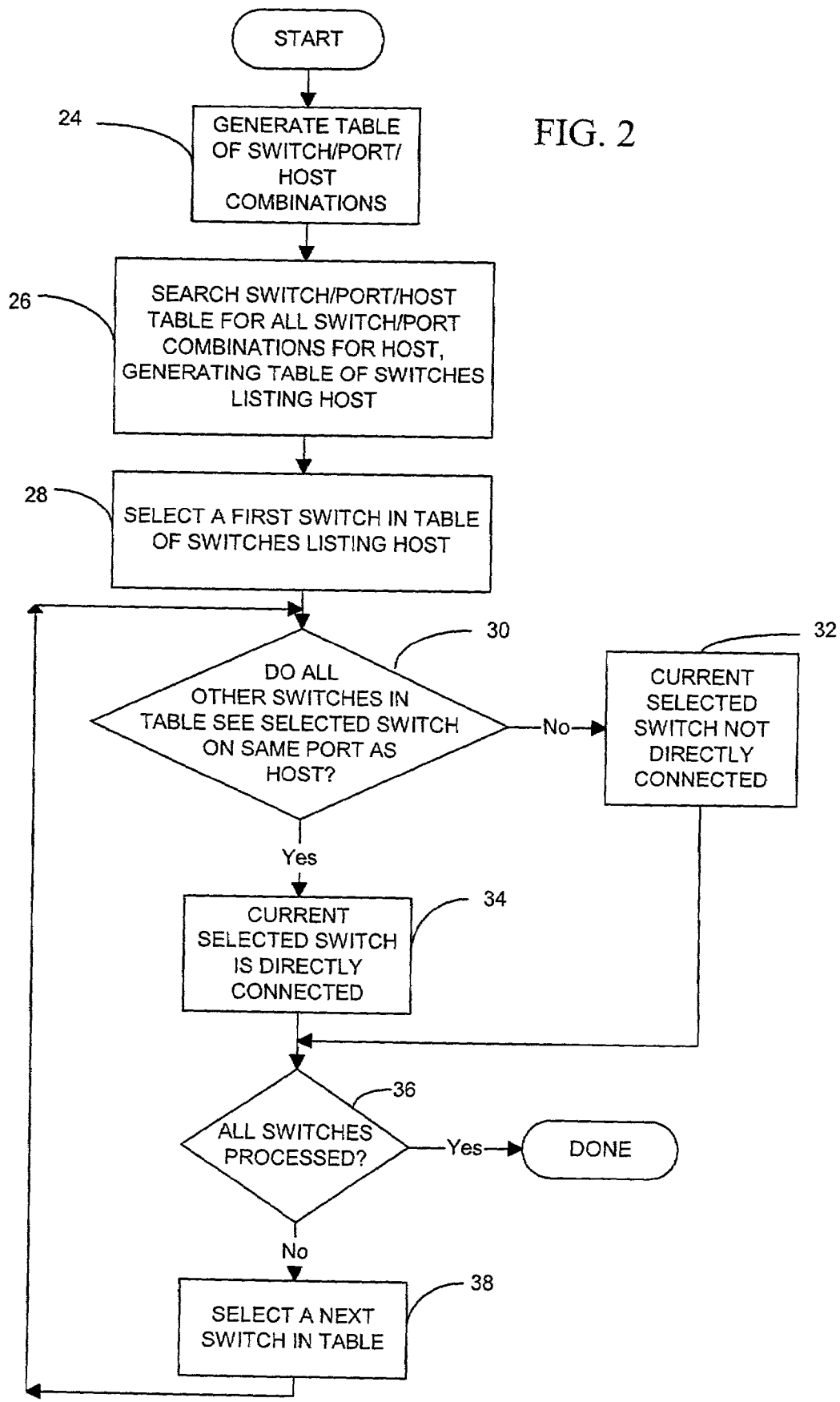

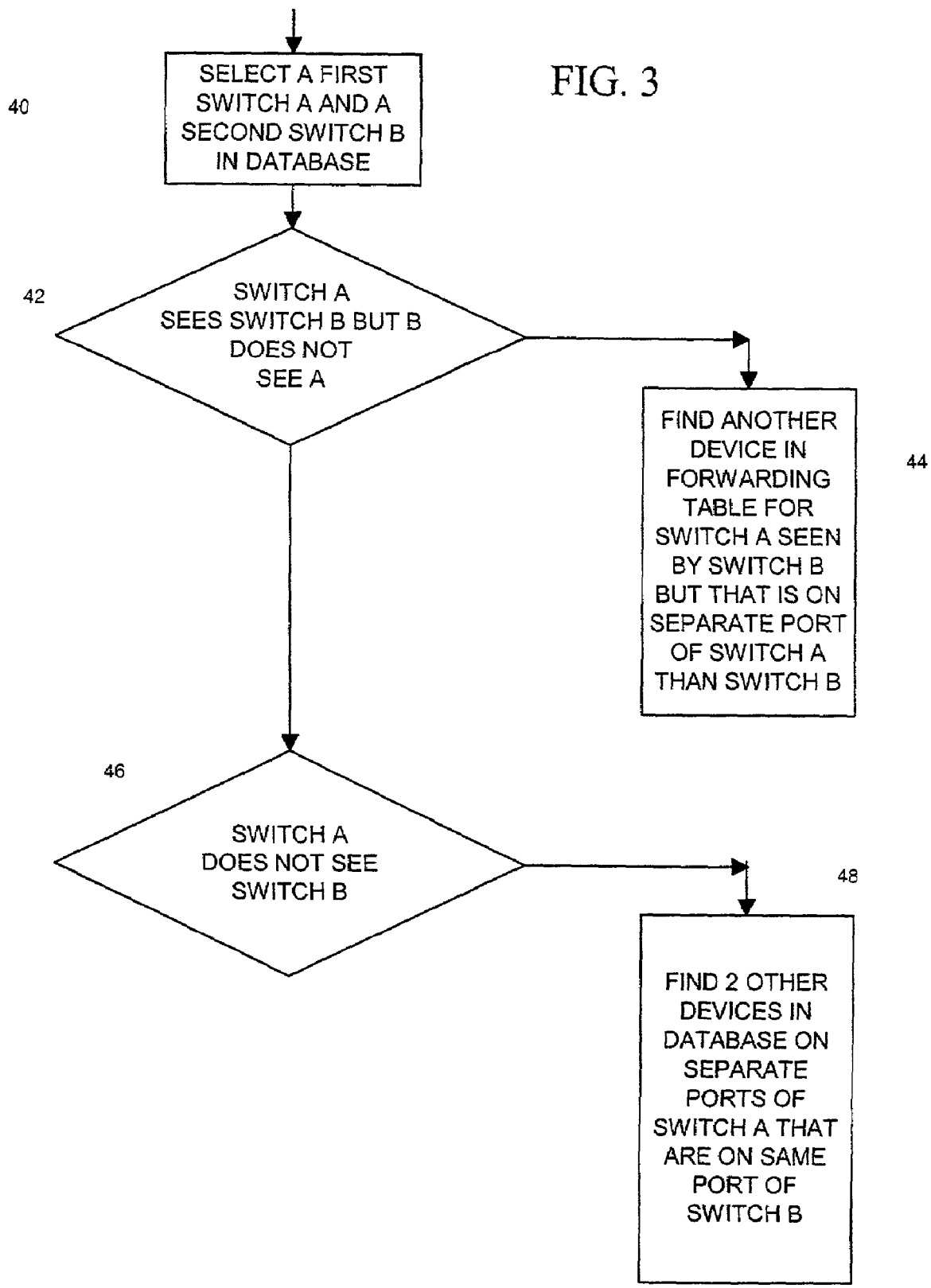

NETWORK SWITCH DISCOVERY METHOD AND APPARATUS

BACKGROUND OF THE INVENTION

This invention relates to networks, and more specifically, to apparatus and methods for determining the closest switch to a network device.

In management of networks, it is desirable to determine how a given network is physically wired. However, such information is not readily apparent or discoverable, as the network is normally spread over a considerable distance, with components thereof located in multiple physical locations. The actual wiring configuration between any given physical locations is essentially interminable by inspection, as network cables (or wireless links) will traverse many structural components of buildings and the like. It becomes desirable to have a way to determine what switches are directly connected to a host device in order to assist in the management of the network.

In switched networks, a problem in determining connectivity is that it is common for switches to not transmit much, so that it is likely that some switches in a subnet will be unaware of other switches.

SUMMARY OF THE INVENTION

In accordance with the invention, a method and apparatus for determining switch connectivity to a device on a network constructs a databases of all the forwarding tables of all the switches on a subnet of a network and is able to determine connectivity therefrom.

Accordingly, it is an object of the present invention to provide an improved method of determining switch connectivity on a network.

It is a further object of the present invention to provide an improved apparatus for discovering how switches on a network are connected.

It is yet another object of the present invention to provide an improved method and apparatus for testing networks.

It is a further object of the present invention to provide an improved method and apparatus for determining switch connectivity on a subnet of an Ethernet local area network.

A still further object of the present invention is to provide an improved computer program for deciding how a selected switch on a local area network is connected to a host.

The subject matter of the present invention is particularly pointed out and distinctly claimed in the concluding portion of this specification. However, both the organization and method of operation, together with further advantages and objects thereof, may best be understood by reference to the following description taken in connection with accompanying drawings wherein like reference characters refer to like elements.

BRIEF DESCRIPTION OF THE DRAWINGS

FIG. 2 is a flow chart of steps in performing the invention; and

FIG. 3 is a flow chart of a part of the steps in building the switch to switch connectivity.

DETAILED DESCRIPTION

Figure 1:
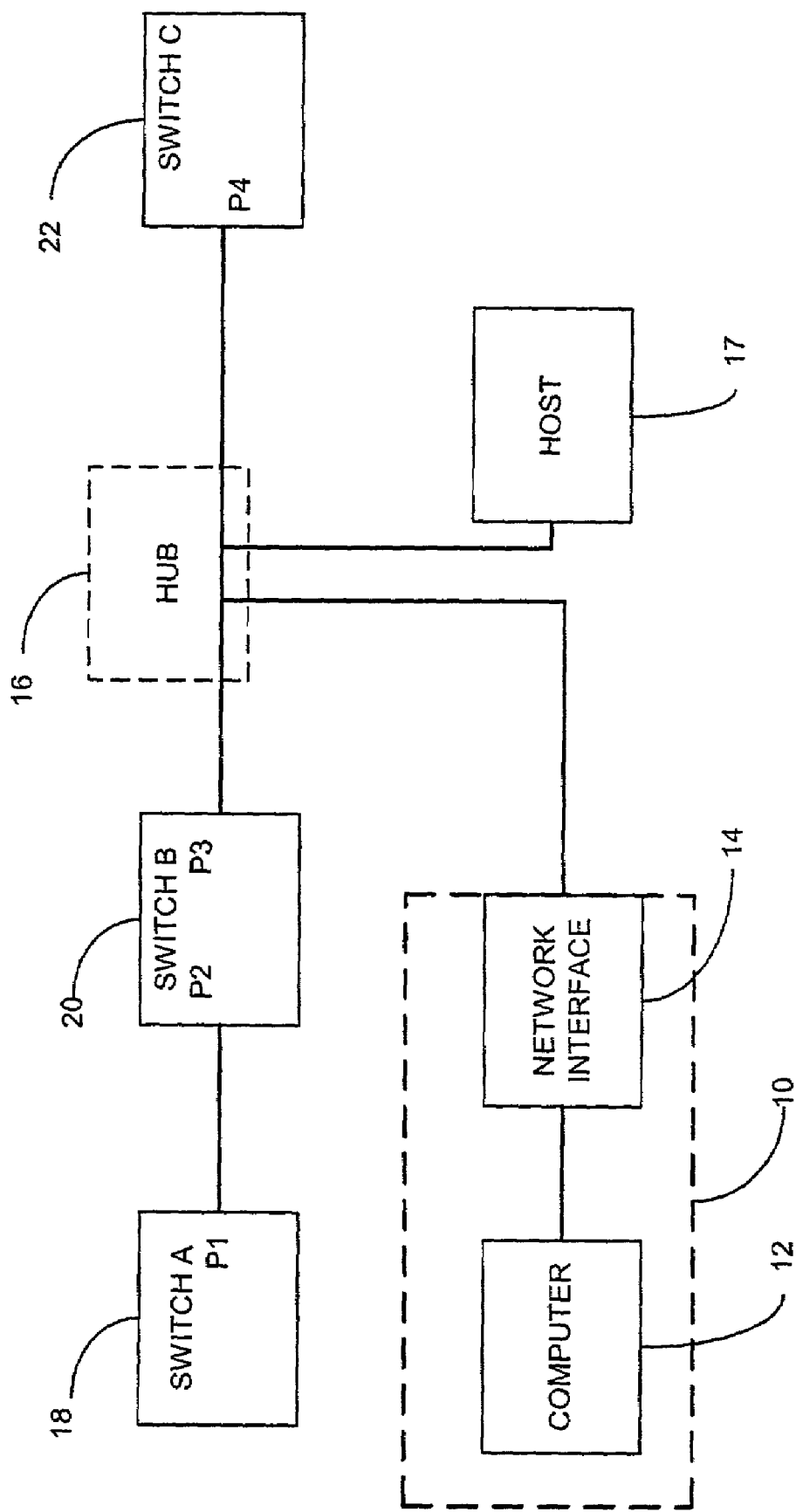
FIG. 1 is a block diagram of an example network employing the system according to the present invention.

The system according to a preferred embodiment of the present invention comprises a method and apparatus for determining the closest switches to a network device. Those switches that are directly connected (i.e. no intervening switches are between the device and a directly connecting switch) are determined and identified.

Referring now to FIG. 1, a block diagram of an example network, which may comprise, for example, an Ethernet local area network, employing the system according to the present invention, the invention is suitably configured as a test instrument 10, which may comprise, in a preferred embodiment, a computer 12 which is connected to a network hub 16 via network interface 14. A HOST 17 is connected to the hub in the illustrated embodiment. The HOST may comprise a device on the network, for example, and it is possible that the test instrument 10 could be the host, but in the illustrated configuration, the HOST 17 and the test instrument 10 are separate devices connected to separate ports on the hub. In the illustrated example, the network to which the HOST is interfaced comprises hub 16 and three switches, SWITCH A (18), SWITCH B (20) and SWITCH C (22). Suitably, the network may comprise an Ethernet local area network (LAN). In the illustrated network configuration, SWITCH A is connected via its port 1 (P1) to a port P2 of SWITCH B, while port P3 (SWITCH B) connects to the hub 16. SWITCH C is also connected to the hub through port 4 (P4). Of course, each switch may have a plurality of other devices connected thereto, as may the hub.

As noted hereinabove, it may be desirable to determine which of the switches are directly connected to the HOST, which in the illustrated embodiment is operating as a network test instrument. Such information is not easily determined by mere inspection of the equipment.

If switch B sees switch C, but switch C does not see switch B, then in accordance with the invention, a search is performed to find a device in the forwarding table of switch B that is not on the port that switch C is on but that is seen by switch C. Then, the port on switch C that contains this particular device is known to be the same port that switch B is connected to. If switch B does not see switch C, then according to the invention, two different devices are located on two separate ports on switch B that are seen on the same port of switch C. That port on switch C is then known to be the port that is connected to switch B.

Thus, suitably all forwarding information on a subnet is gathered into a common database. This database is then examined to determine the switch to switch awareness on the subnet. If any awareness is missing, then according to the steps discussed above, those awareness "blanks" are resolved.

Referring now to FIG. 2, which is a flow chart of steps in performing the invention, when it is desired to determine switches that are directly connected to the HOST, in accordance with the invention, a database is generated (step 24) of the switch/port/host combinations on the network (which, may comprise a sub network). To accomplish this, the forwarding tables for the switches in the network are queried by the test instrument 10 to obtain the data for generating the table. This data tells which port a given switch will use to access a particular host. As discussed above, a database is constructed of the forwarding information, and the connectivity of the switches is resolved.

FIG. 3 shows steps involved in filling in missing switch connectivity in the database construction, which results from building a common database of all the forwarding information from switches on a subnet. The database information discussed herein suitably includes MAC (media access control) addresses. This database includes all the forwarding information from the switches on a subnet, and may, for a particular switch, include gaps from a switch not knowing the connectivity to another switch. Thus, the connectivity gaps are resolved and filled in to complete the database. First, in step 40, a first and second switch are selected, denoted switch A and switch B in this example. Then, at decision step 42 if switch A can "see" switch B (that is, does switch A know how it connects to switch B) but if switch B cannot see switch A, then in step 44, the database is searched to find another device in the forwarding table of switch A which is known by switch B but is not on the port that switch B is on to connect to switch A. This is then the port on which B connects to A.

If switch A does not see switch B (decision 46), then the database is searched for two other devices that are on separates ports of switch A but that are seen on the same port of switch B. Then it is know that the port on switch B is the port that is connected to switch A.

These steps are repeated for the combination of switches, to generate the switch to switch connectivity table.

Next, returning to FIG. 2, in step 26, the table that was generated is searched to locate all the switches that include a listing for the HOST. These switches are placed in a table and a first switch is selected, called the selected switch, (step 28) to begin processing of all the switches in the table.

In decision block 30, a determination is made as to whether all the other switches in the table generated in step 26 list the selected switch as being on the same port as the HOST. The data for each of the other switches (except the selected switch) in the table is suitably examined until either: 1) a switch table entry is found where the port indicated by that particular switch table entry for access to the HOST differs from the table entry for access to the selected switch, or 2) all the switches in the table have been examined. If a switch is found that has different ports listed for the HOST and selected switch, then we know that the selected switch is not directly connected to the HOST. In such case, the answer to decision block 30 is "no" and step 32 indicates that the selected switch is not connected directly to our HOST. Processing then continues with decision block 36 discussed hereinbelow.

If no switch was found that lists different ports for the HOST and the selected switch, then block 34 is entered, indicating that the selected switch is directly connected to the HOST. Now, decision block 36 is entered (or, as noted hereinabove, decision block 36 may also be entered via block 32) and a determination is made whether all switches (in the table of switches that list the HOST) have been processed. If so, then the process is done. If not, then block 38 is performed to select a next switch in the table of switches that list the HOST, and processing continues, looping back to decision block 30. The loop continues until all the switches in the table of switches listing the HOST have been processed.

The information for each switch from blocks 32 and 34 is suitably collected and used for further procedures relating to network maintenance.

Referring again to FIG. 1, employing the invention with the illustrated network configuration results in the information that SWITCH A sees the HOST 17 on port 1, SWITCH B sees the HOST on port 3 and SWITCH C sees the HOST on port 4. It is determined that SWITCH A is not directly connected to the HOST because SWITCH B sees SWITCH A on port 2 but sees the HOST on port 3. SWITCH B is directly connected to the HOST because SWITCH A sees both the HOST and SWITCH B on port 1 and SWITCH C sees both the HOST and SWITCH B on port 4. SWITCH C is determined to be directly connected because SWITCH A sees SWITCH C and the HOST both on port 1 and SWITCH B sees both SWITCH C and the HOST on port 3.

While the illustrated example shows a relatively small network, in practice, a network may have hundreds of nodes and the determination may be made for plural, different hosts, to generate a representation of the network configuration. The configuration of FIG. 1 is simply an example of a possible network configuration, and it will be understood that the HOST 17 is not required to be connected to the same hub or switch as the test instrument.

In the preferred embodiment, the invention is implemented as a software program, suitably operating on a computer connected to a network. However, an alternate embodiment comprises a network test instrument incorporating the invention therein. Accordingly, an apparatus and method of determining switches that are directly connected to a host on a computer network is provided by the invention. The switch connection determination is suitable for information and analysis of the physical connection profile of a network, which may be useful to network management professionals in maintaining and optimizing operation of the network.

While a preferred embodiment of the present invention has been shown and described, it will be apparent to those skilled in the art that many changes and modifications may be made without departing from the invention in its broader aspects. The appended claims are therefore intended to cover all such changes and modifications as fall within the true spirit and scope of the invention.

The invention claimed is:

1. A method for determining which of a plurality of switches directly connect to a host, wherein ones of said switches comprise at least one port, comprising the steps of:
    (a) generating a database from forwarding table information from plural switches on a subnet;
    (b) parsing the database to determine switch connectivity information that may be missing from the database information obtained from a given switch;
    (c) determining the ports on which ones of the plurality of switches are connected to the host;
    (d) determining the ports on which ones of the plurality of switches are connected to other ones of said plurality of switches;
    (e) selecting a first switch of said plurality of switches; and
    (f) for said selected switch, determining whether other switches in said plurality of switches are connected to said selected switch on the same port as said selected switch is connected to said host, thereby determining whether said selected switch is directly connected to said host.

2. The method for determining which of a plurality of switches directly connect to a host according to claim 1, further comprising the steps of:
    (g) selecting a next switch;
    (h) repeating step (f) and (g) for each of said plurality of switches, thereby determining all switches which are directly connected to said host.

3. An apparatus for determining which of a plurality of switches on a network directly connect to a host, wherein ones of said switches comprise at least one port, comprising:
    a network interface for connecting with the network and exchanging data therewith;

a processor for generating a database of forwarding information from switches, determining switch interconnectivity for plural ones of switches, determining the ports on which ones of the plurality of switches are connected to the host, and for determining the ports on which ones of the plurality of switches are connected to other ones of said plurality of switches, and for selecting a first switch of said plurality of switches, and for said selected switch, determining whether other switches in said plurality of switches are connected to said selected switch on the same port as said selected switch is connected to said host, thereby determining whether said selected switch is directly connected to said host.

4. The apparatus for determining which of a plurality of switches directly connect to a host according to claim 3, wherein said processor further selects a next switch and repeats
  a) for said selected switch, determining whether other switches in said plurality of switches are connected to said selected switch on the same port as said selected switch is connected to said host, thereby determining whether said selected switch is directly connected to said host, and
  b) selecting a next switch,
  for each of said plurality of switches, thereby determining all switches which are directly connected to said host.

5. A method for determining in a subnet of an Ethernet local area network of a plurality of switches whether a selected switch directly connect to a host, wherein ones of said switches comprise at least one port, comprising the steps of:
  (a) accessing a forwarding table for each of the plurality of switches in the subnet and building a database of information therefrom;
  (b) processing said database to complete switch connectivity information therein;
  (c) generating a first table of switch/port/host combinations based on the accessing of the forwarding tables;
  (e) searching through said first table to locate all switches that list the host;
  (e) generating a second table of switches that list the host; and
  (f) for a first switch in said second table, determining whether all other switches in said second table of switches are connected to said first switch on the same port as said first switch is connected to the host, thereby determining whether said first switch is directly connected to said host.

6. The method for determining in a subnet of an Ethernet local area network of a plurality of switches whether a selected switch directly connect to a host according to claim 5, further comprising the steps of:
  (g) for each other switch in said second table, determining whether other switches in said plurality of switches are connected to said each other switch on the same port as said each other switch is connected to the host, thereby determining whether ones of said each other switches are directly connected to said host, and thereby determining all switches which are directly connected to said host.

7. The method for determining in a subnet of an Ethernet local area network of a plurality of switches whether a selected switch directly connect to a host according to claim 6, wherein the Ethernet local area network comprises a plurality of hosts, further comprising the steps of:
  (h) repeating said steps (d)–(g) for ones of the plurality of hosts.

* * * * *